(12) United States Patent
Kuo et al.

(10) Patent No.: US 10,030,169 B2
(45) Date of Patent: Jul. 24, 2018

(54) SOLVENTLESS RELEASE COATING ORGANOPOLYSILOXANE COMPOSITION AND SHEET-FORM SUBSTRATE HAVING CURED RELEASE COATING

(71) Applicants: Dow Corning Corporation, Midland, MI (US); Dow Corning (China) Holding Co., Ltd., Shanghai (CN)

(72) Inventors: Chung Mien Kuo, Chungli (TW); Yang Wayne Wang, Shanghai (CN); Johnny Yan Zhou, Shanghai (CN)

(73) Assignees: Dow Silicones Corporation, Midland, MI (US); Dow (Shanghai) Holding Co., Ltd., Shanghai (CN)

( * ) Notice: Subject to any disclaimer, the term of this patent is extended or adjusted under 35 U.S.C. 154(b) by 148 days.

(21) Appl. No.: 15/031,335

(22) PCT Filed: Oct. 24, 2014

(86) PCT No.: PCT/CN2014/089459
§ 371 (c)(1),
(2) Date: Apr. 22, 2016

(87) PCT Pub. No.: WO2015/058715
PCT Pub. Date: Apr. 30, 2015

(65) Prior Publication Data
US 2016/0244636 A1   Aug. 25, 2016

(30) Foreign Application Priority Data

Oct. 25, 2013  (WO) ................ PCT/CN2013/085943

(51) Int. Cl.
| | | |
|---|---|---|
| *C08G 77/12* | (2006.01) | |
| *C09D 183/04* | (2006.01) | |
| *C09J 7/02* | (2006.01) | |
| *C09J 7/04* | (2006.01) | |
| C08G 77/20 | (2006.01) | |

(52) U.S. Cl.
CPC ............ *C09D 183/04* (2013.01); *C09J 7/025* (2013.01); *C09J 7/0228* (2013.01); *C09J 7/046* (2013.01); *C08G 77/12* (2013.01); *C08G 77/20* (2013.01); *C09J 2483/005* (2013.01)

(58) Field of Classification Search
None
See application file for complete search history.

(56) References Cited

U.S. PATENT DOCUMENTS

| | | | | |
|---|---|---|---|---|
| 4,057,596 A | * | 11/1977 | Takamizawa | C08L 83/04 427/387 |
| 4,123,604 A | | 10/1978 | Sandford, Jr. | |
| 4,293,671 A | * | 10/1981 | Sasaki | C08L 83/04 525/478 |
| 4,340,647 A | * | 7/1982 | Eckberg | C08K 5/11 427/387 |
| 4,525,391 A | * | 6/1985 | Eckberg | B05D 5/08 156/704 |
| RE32,245 E | * | 9/1986 | Grenoble | C08L 83/04 427/387 |
| 4,870,149 A | | 9/1989 | Hara et al. | |
| 4,923,944 A | * | 5/1990 | Yamada | C08L 83/04 524/300 |
| 5,432,006 A | | 7/1995 | Kessel et al. | |
| 5,468,815 A | * | 11/1995 | Boardman | C09D 183/04 525/478 |
| 6,124,419 A | * | 9/2000 | Armstrong | C08K 5/01 252/182.14 |
| 6,274,692 B1 | * | 8/2001 | Herzig | C08G 77/20 427/387 |
| 6,562,469 B2 | * | 5/2003 | Koyama | C08K 5/02 428/447 |
| 6,569,914 B2 | | 5/2003 | Zoellner et al. | |
| 7,414,096 B2 | * | 8/2008 | Irifune | C08L 83/04 525/477 |
| 2003/0180468 A1 | * | 9/2003 | Cray | C09D 183/04 427/387 |
| 2005/0129963 A1 | * | 6/2005 | Radl | C09D 183/04 428/447 |
| 2011/0160376 A1 | | 6/2011 | Hori et al. | |
| 2011/0287267 A1 | | 11/2011 | Hori et al. | |

FOREIGN PATENT DOCUMENTS

| | | |
|---|---|---|
| CN | 102089356 A | 6/2011 |
| CN | 102224188 A | 10/2011 |
| EP | 1221468 A1 | 7/2002 |
| JP | 61-159480 A | 7/1986 |
| WO | WO2005059039 A2 | 6/2005 |
| WO | WO2008084747 A2 | 7/2008 |

OTHER PUBLICATIONS

Gelest, Reactive Silicones: Forging New Polymer Links, 2013, 68 pages. (Year: 2013).*
PCT/CN2014/089459 International Search Report dated Jan. 30, 2015, 3 pages.
English language abstract for JP61159480A extracted from http://www.thomsoninnovation.com database on Apr. 7, 2016, 1 page.

* cited by examiner

*Primary Examiner* — Robert S Loewe
(74) *Attorney, Agent, or Firm* — Warner Norcross & Judd LLP

(57) ABSTRACT

This invention relates to solventless release coating organopolysiloxane composition and sheet-form substrate having cured release coating, providing a solventless release coating organopolysiloxane composition having a viscosity of 50 to 3,000 mPa s, comprising (A) 100 parts of an organopolysiloxane fluid having a viscosity at 25° C. of 10 to 1,000 mPa s and alkenyl content of 0.10 to 3.0 wt %; (B) 0.5 to 15 parts of a diorganopolysiloxane having a viscosity at 25° C. of 10,000 to 150,000 mPa s, and 0.05 to 0.30% of alkenyl groups at the pendant position of its siloxane-chain and trialkylsiloxy-terminals; (C) a prescribed quantity of an organohydrogenpolysiloxane; and (D) a hydrosilylation reaction catalyst. Also, a cured release coating-bearing sheet-form substrate that has a cured coating from this solventless release coating organopolysiloxane composition is provided.

11 Claims, No Drawings

10,030,169 B2

SOLVENTLESS RELEASE COATING ORGANOPOLYSILOXANE COMPOSITION AND SHEET-FORM SUBSTRATE HAVING CURED RELEASE COATING

CROSS-REFERENCE TO RELATED APPLICATIONS

This application is the National Stage of International Application No. PCT/CN2014/089459 filed on 24 Oct. 2014, which claims priority to and all advantages of International Patent Application No. PCT/CN2013/085943 filed on 25 Oct. 2013, the content of which is hereby incorporated by reference.

TECHNICAL FIELD

The present invention relates to a solvent-free composition for the silicone release coating application.

This invention relates to curable silicone release coating compositions. Silicone based release coatings are useful in applications where relatively non-adhesive surfaces are required. A curable silicone release coating composition is applied to a substrate also named 'liner', which can for example be paper or a polymer film, then is cured. Single-sided liners, for example, backing sheets for pressure sensitive adhesive labels, are used to temporarily retain the labels without affecting the adhesive properties of the labels. Double-sided liners, for example interleaving papers for double-sided and transfer tapes, are used to ensure the protection and desired unwind characteristics of a double-sided self-adhesive tape or adhesive film. The release coating is required to adhere well to the liner while having relatively low adhesion to the adhesive so that the label can be removed from the liner by a predetermined peel force.

A liner substrate is coated by applying a silicone based release coating composition onto the substrate and subsequently curing the composition. The preferred curing mechanism is thermally initiated hydrosilylation, which can be modified to vary the adhesive force between the release coating and the adhesive label.

Hydrosilylation is an addition reaction where a compound containing at least one unsaturated bond reacts with a compound containing at least one Si—H bond. An unsaturated bond is a bond comprising a double or triple liaison between two atoms. The bonded atoms may be both carbon atoms or carbon-heteroatom. For example an unsaturated bond can be alkenyl.

The basic constituents of silicone based release coating compositions which are cured by hydrosilylation are (A) a polyorganosiloxane containing alkenyl groups, (B) a cross-linking agent (also called crosslinker) containing organohydrogensiloxane groups and a catalyst for the hydrosilylation reaction between (A) and (B).

The liner substrate can be paper or polymer substrate such as polyester, for example polyethylene terephthalate, film, polypropylene or polyethylene, particularly for clear on clear labels.

A polysiloxane or silicone is a polymer based on Si) units. It can comprise at least one of the following units: M unit (mono-functional), D unit (di-functional), T unit (tri-functional), Q unit (tetra-functional). The Si atom of a M unit is bonded to 1 O atom. The Si atom of a D unit is bonded to 2 O atoms. The Si atom of a T unit is bonded to 3 O atoms. The Si atom of a Q unit is bonded to 4 O atoms.

A M unit typically has the formula $R^aSiO_{1/2}$. A D unit typically has the formula $R^bR^cSiO_{2/2}$. A T unit has the formula $R^dSiO_{3/2}$. A Q unit typically has the formula $SiO_{4/2}$.

$R^a$, $R^b$, $R^c$, $R^d$ are each a substituent, preferably an organic substituent. Each substituent $R^a$ $R^b$ $R^c$ or $R^d$ can be selected for example from alkyl, aryl, alkenyl, acrylate, methacrylate and others. For example it can be an alkenyl group having 2 to 6 carbon atoms, for example a vinyl (also named as Vi or vi) group or a hexenyl group.

A branched polysiloxane sometimes called a resin typically contains at least one T unit and/or at least one Q unit. A linear polysiloxane typically contains D units and optionally M units. An MQ resin is an organopolysiloxane containing at least one M unit and at least one Q unit. A Q-branched resin is a branched silicone comprising at least one Q unit.

The silicone release coating composition is applied to coat a layer on films or paper substrate and cured under thermal addition to form a coated substrate. The invention is intended to provide a coated release liner with slippery surface and low release force for tape release or label release application. In particular, the present invention relates to a solventless release coating organopolysiloxane composition, a cured release coating-bearing sheet-form substrate yielded by curing the above solventless release coating organopolysiloxane composition in the form of a thin film on a sheet-form substrate, and a production method for a cured release coating-bearing sheet-form substrate by applying the above solventless release coating organopolysiloxane composition on at least one side of sheet-form substrate with multiple rolls coater.

BACKGROUND ART

Compositions for release coating application can be in the form of emulsion (water-based), solvent-based or solventless (free of solvent). Solventless silicone release coating compositions have some important advantages over solvent-based and emulsion coating compositions:

Fewer environmental, health, safety, and regulatory concerns
No solvent recovery equipment required
Contain no carrier that must be driven off, so line speeds can be faster
Less likely to damage films.

Conventionally, a solventless (SL) type silicone release coating has fast cure but base polymers in coating bath have to be low viscosity to meet the multiple rolls coating process requirement. The low viscosity limits the degrees of polymerization of polyorganosiloxane for a base polymer. It may be difficult to provide slippery surface to the cured coating and low release force for adhesive majorly due to tight crosslinking density. To overcome such a technical problem, the prior art has proposed several solutions.

For example, WO 2008084747 A2 (Patent Reference 1, incorporated herein for reference) discloses a solventless, cured release coating-forming organopolysiloxane composition, comprising:
(A) 100 parts of an organopolysiloxane fluid having a branched structure and comprising
(i) the siloxane unit represented by the formula $SiO_{4/2}$,
(ii) the siloxane unit represented by the general formula $R_2SiO_{2/2}$, and (iii) the siloxane unit represented by the general formula $R^aR_2SiO_{1/2}$;

(B) 0.5 to 15 parts of a diorganopolysiloxane with the average structural formula $R^aR^c_2SiO(R^bR^cSiO_{2/2})_{n1}(R^c_2SiO_{2/2})_{n2}SiR^c_2R^a$;

(C) a prescribed quantity of an organohydrogenpolysiloxane; and (D) a hydrosilylation reaction catalyst.

Also, a sheet-form substrate that has a cured coating from this solventless, cured release coating-forming organopolysiloxane composition is provided.

The diorganopolysiloxane (B) contains alkenyl groups. It is said [0029] that the alkenyl content must be kept very low, especially maximum 0.1 mole % of the silicone-bonded organic groups being alkenyl (it may well be that the word "mole" means in fact "weight"). According to the examples, the vinyl content in the component (B) of Patent reference 1 is 0.02 weight %.

Component (B) of patent reference 1 must have a viscosity at 25 C of at least 100,000 mPa s and preferably at least 1,000,000 mPa s (see [0030]).

Comparative example 3 of WO 2008084747 A2 discloses the following composition: 100 parts of the dimethylvinylsiloxy-end blocked dimethylpolysiloxane shown by the following average structural formula (viscosity=400 mPa·s, calculated vi % (vinyl %)=0.62 wt %),

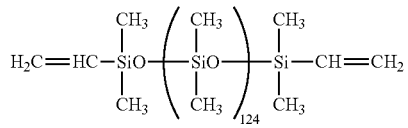

1.0 part of (B<1>) dimethylsiloxane diphenylsiloxane copolymer having molecular chain terminals end blocked by a dimethylvinylsiloxy group and a trimethylsiloxy group (diphenylsiloxane unit content=5 mol %, viscosity=50,000 mPa·$), 2.0 parts of (C) methylhydrogenpolysiloxane end-blocked at both molecular chain terminals by trimethylsiloxy groups (viscosity=20 mPa·s, silicon-bonded hydrogen content=1.6 weight %), and 0.30 parts of (E) 1-ethynyl-1-cyclohexanol were mixed to homogeneity; into this mixture was admixed a (D) chloroplatinic acid-1,3-divinyl-1,1,3,3-tetramethyldisiloxane complex (platinum metal content=0.60 wt %) in a quantity sufficient to give 100 ppm platinum (also named platinum) metal, thus yielding a solventless, cured release coating-forming organopolysiloxane composition (viscosity=400 mPa s); the dynamic coefficient of friction and the peel resistance value were measured on the obtained composition; these results are shown in Table 4. WO 2008084747 A2 indicates that the technical intention thereof is "bleed-out" effect of slippery additive having high viscosity on the surface of the cured layer. The additive may create a loose structure by light end-linked with vulcanized network with crosslinker or entanglement of long polymeric chains.

For example, JP 61159480 A (Patent Reference 2, incorporated herein for reference) discloses a silicone composition for release paper which is characterized by comprising:
1) Organopolysiloxane having at least two or more vinyl groups in a side-chain, at least one or more vinyl groups bonding on side-chain position, the content of vinyl group within 0.5 to 10.0 mol % and viscosity at 25° C. of 50 to 10,000 mPa s 100 weight parts;

2) Organopolysiloxane having smaller content of vinyl group than said organopolysiloxane and viscosity at 25° C. of at least 100,000 mPa s 0.5 to 30.0 weight parts;
3) Organohydrogenpolysiloxane having at least two silicon-bonded hydrogen in a molecule 0.5 to 60.0 weight parts; and
4) Catalytic quantity of Platinum or Platinum compounds.

JP 61159480 A provides a release coating characterized by low- or non-reactive gum migration (bleed-out) (breed-out) onto the surface of cured coating layer providing good slipperiness. JP 61159480 A indicates that its object is to obtain a silicone composition which imports excellent slipperiness to material to be treated, by blending two organopolysiloxanes, an organohydrogenpolysiloxane and a platinum catalyst.

For example, WO 2005059039 A2 (Patent Reference 3, incorporated herein for reference) discloses a thermal addition curable solventless silicone release composition having a reduced coefficient of friction and improved slip characteristics. The invention is also directed to a method using alpha-olefins with reactive polyorganosiloxane for producing a thermal addition curable solventless silicone release composition on a substrate by applying the thermal addition curable solventless release composition of the invention to a substrate and curing the coating on the substrate using heat. The invention is further directed to a thermal addition curable solventless silicone release coated article having a reduced coefficient of friction and improved slip characteristics.

For example, US 20110287267 A1 (Patent Reference 4, incorporated herein for reference) discloses a solventless cured release coating-forming organopolysiloxane composition having a viscosity at 25° C. of 50 to 2,000 mPa·s, comprising (A) 100 weight parts of an alkenyl-functional diorganopolysiloxane that has a viscosity of 25 to 1,000 mPa·s; (B) 0.5 to 15 weight parts of a diorganopolysiloxane that has a viscosity of at least 10,000 mPa·s and that has an aliphatically unsaturated group content of no more than 0.1 mol %; (C) 0.5 to 5 weight parts of a branched organopolysiloxane that has more than one $SiO_{4/2}$ unit and that is a polymer product provided by an equilibration polymerization between a branched organosiloxane oligomer represented by the average siloxane unit formula (1) $(SiO_{4/2})(R^aR^b_2SiO_{1/2})_x(1)$ and a diorganosiloxane oligomer; (D) a specific amount of an organohydrogenpolysiloxane that has a viscosity of 1 to 1,000 mPa·s; and (E) a hydrosilylation reaction catalyst in a catalytic quantity.

For example, U.S. Pat. No. 6,569,914 B2 (Patent Reference 5, incorporated herein for reference) discloses low solvent and solvent-free silicone release coatings, which may be prepared with varying COF (COEFFICIENT OF FRICTION) levels by incorporating a very high molecular weight, substantially non-reactive organopolysiloxane into a conventional curable release coating. By supplying the COF additive in the form of a relatively low viscosity master batch, adjustment of COF may be made by the coating applicator. Very low COF values can be obtained from tin-free, solvent-free coating systems, while at the same time, the coatings have very low extractables.

For example, U.S. Pat. No. 4,123,604 A (Patent Reference 6, incorporated herein for reference) discloses a novel and improved coating composition and an improved process for coating substrates. The compositions are essentially solventless and when cured give highly abrasion resistant coatings, non-blocking characteristics, fast cure and a general overall aesthetic appearance. An example of coating a substrate is the coating of paper products to give release from adhesives.

For example, U.S. Pat. No. 4,870,149 A (Patent Reference 7, incorporated herein for reference) discloses a solvent-free releasing silicone composition for rendering surfaces non-adherent which gives a cured film having desirable slip factor, toughness, and high-speed peel characteristics without sacrificing its inherent merits such as curability, uniformity in peel resistance, and the residual adhesive strength employs a diorganovinylpolysiloxane having trivinylsilyloxy as one end group and either a vinyldimethylsilyl or trimethylsilyl group as the other end group.

For example, U.S. Pat. No. 5,432,006 A (Patent Reference 8, incorporated herein for reference) discloses curable, solventless, liquid polyorganosiloxane compositions, which provide release coatings that exhibit a slippery feel. The composition comprises (a) a first polydiorganosiloxane terminated by silyl groups having one reactive group; (b) a second polydiorganosiloxane terminated by silyl groups having one reactive group, the reactive group of (a) being the same or different from the reactive group of (b), said reactive groups of (a) and (b) being reactive with one another to form a covalent bond; (c) a polydiorganosiloxane having three or more reactive groups that are reactive with either the reactive group of (a) or the reactive group of (b) or both to form a covalent bond; and (d) a catalyst for effecting the reaction of the reactive groups of (a), (b), and (c) to form covalent bonds. When coated on a substrate and cured, the composition provides release liners for pressure-sensitive adhesive tapes and pressure-sensitive adhesive transfer tapes.

However, the above Patent References 1-8 fail to well solve the above technical problem. Particularly, both Patent Reference 1 and Patent Reference 2 disclose using organopolysiloxane having a higher viscosity than 100,000 mPa s. Furthermore, in these Patent References, the viscosity of below 100,000 mPa s results in poor slipperiness of obtained cured coating layer for insufficient bleed-out effect and much adhesive residue thereof. From practical viewpoint of these inventions, the viscosity of 100,000 mPa s seems to be insufficient. Preferred one should be polysiloxane having viscosity of 1,000,000 mPa s or more. For example, both Patent References disclose to use extra high molecular weight (gum state) organopolysiloxanes having at least 1,000,000 mPa s in all practical examples. Therefore, both Patent Reference 1 and Patent Reference 2 need polymer with higher viscosity for its specific technical effect. For example, as seen from the paragraph [0006] and paragraphs [0026]-[0030] of Patent Reference 1, the component (B), polysiloxane having viscosity of at least 100,000 mPa s, functions to improve the releasability of the cured coating with respect to tacky substances and also functions to provide the cured coating with slipperiness. That is to say, though the component (B) has light linkage with cure network, it shall have free polymer chains bleed-out on the surface of cured coating layer and provide good slipperiness on it. Additionally, without vi-group in pendant position in defined range, the gum state organopolysiloxanes tends to easily extract from the cured body, if end-group reaction is not working well. However, obviously, neither Patent Reference 1, Patent Reference 2 nor Patent Reference 5 can easily provide a limited release coating composition keeping suitable low viscosity for multiple roll-coater, while possessing excellent properties.

Therefore, there still exists a need in the art for obtaining a release coating composition keeping suitable low viscosity for multiple roll-coater, while possessing excellent properties including high-speed cure with low amount of catalyst, cured layer with low migration, slippery & good smooth touch of the coating surface, good anchorage to the substrate, and low release force to sticky adhesives.

SUMMARY OF THE INVENTION

The present invention was pursued in order to solve the problems cited above and has as an object the introduction of a solvent-free composition for the silicone release coating application. The release coating composition is applied to coat a layer on films or paper substrate and cured under thermal addition to form a coated substrate. Another object of the present invention is to provide a coated release liner with slippery surface and low release force for tape release or label release application.

To overcome the above existing defect, this invention discloses a cured release coating composition comprising (A) reactive organopolysiloxane fluid having a viscosity at 25° C. of 10 to 1,000 mPa s and alkenyl content of 0.10 to 3.0 wt % (based on Vi) of the organopolysiloxane (A), and (B) a certain long chain polysiloxane additive in hydrosilylation curing system. The component (B) has high viscosity in limited range (10,000 to 150,000 mPa s), which reactive vinyl functional group with a range of (0.05 to 0.3 wt % compared to weight of (A)) on side chain position and non-reactive terminals. This structural feature of component (B) easily forms covalently bonded by hydrosilylation with SiH function crosslinker.

Except if stated otherwise, viscosity is measured at 25 C.

The component (B) possesses some pendant vinyl functional group (alkenyl group), which can form covalent bond with cured system by hydrosilylation. And the both trialkylsiloxy terminals are not cured with the system, which can help lead partial of molecular chains freely migrate to the surface of cured release coating. This property can provide the cured release coating with a slippery touch feeling and low release force. Siloxane having a moderate viscosity (10,000 to 150,000 mPa s at 25° C.) can provide the final release coating bath with feasible viscosity for multiple rolls coater, and also can have an appropriate reactivity when vulcanization.

In addition, the concept of current invention is different from said "bleed-out" effect, because the pendant alkenyl group in the siloxane can act as "anchor" point to bond component (B) into cured system. And siloxane having a viscosity of 10,000 to 150,000 mPa s at 25° C. has entanglement effect with cured system, which would also reduce silicone migration.

Through cross-linking or vulcanization (addition-curing under Pt-catalyst), the component (B) form a part cured network between said reactive organopolysiloxane fluid and SiH function crosslinker (i.e. component (C)) on substrate. That can bring dry coating a slippery touch feeling and also provides a lower release force to sticky adhesive. The viscosity of coating bath maintains a reasonable base viscosity suitable for multiple rolls coater. These performance properties of coating liner can reduce the noise in application stage and can protect the finger or arm of operators from friction burn during repeatedly peeling release liner. In addition, the invention can reduce risk of blocking problem in making in situ two side coating process.

The above Patent Reference 1, as the closest prior art, fails to disclose a combination of Q-branched or linear reactive organopolysiloxane and low reactive diorganopolysiloxane having a viscosity at 25° C. of 10,000 to 150,000 mPa s, 0.05 to 0.30% of alkenyl groups at the pendant position of its siloxane-chain and trialkylsiloxy-terminals in hydrosilylation-curing composition as defined in the present invention, i.e. fails to disclose the combination between said component (A) and component (B). Especially, the preferred component (B) in Patent Reference 1 is substantially different from the component (B) in the present invention (i.e. trimethylsiloxy-capped PDMS (polydimethylsiloxane) with vinyl at pendant position). The above Patent Reference 2 completely fails to disclose or teach using branched polymer, especially using Q-branched polymers. The other vinyl content of reactive polymers is higher than those of the component (A) in the present invention. For said Patent Reference 1 and Patent Reference 2 which intend to bleed-out of those polymeric chains of gum state organopolysiloxanes on the surface of cured body, they never teach to use certain amount of vi-group of polyorganosiloxane in pendant position for easy-formation of bonding by hydrosilylation with Si—H polymers.

DISCLOSURE OF THE INVENTION

The objects cited above can be achieved by the following:
(1) A solventless release coating organopolysiloxane composition having a viscosity of 50 to 3,000 mPa s, comprising:
(A) 100 weight parts of an organopolysiloxane fluid having a viscosity at 25° C. of 10 to 1,000 mPa s and alkenyl content of 0.10 to 3.0 wt %;
(B) 0.5 to 15 weight parts of a diorganopolysiloxane represented by the average structural formula (1), having a viscosity at 25° C. of 10,000 to 150,000 mPa s and alkenyl content of 0.05 to 0.30 wt %:

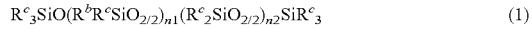

wherein $R^b$ is alkenyl having 2 to 8 carbon atoms; $R^c$ is alkyl group having 1 to 8 carbon atoms or phenyl; n1 is a number that provides alkenyl content of 0.05 to 0.30 wt % based on vi; n2 is a number with a value of at least 1; and n1+n2 is a number that provides this component with a viscosity at 25° C. of 10,000 to 150,000 mPa s;
(C) an organohydrogenpolysiloxane that has a viscosity at 25° C. of 1 to 1,000 mPa s and that has at least two silicon-bonded hydrogen atoms in each molecule, wherein the silicon-bonded organic groups are alkyl group having 1 to 8 carbon atoms or phenyl group, in an amount sufficient to provide a value of 0.8:1 to 5:1 for the molar ratio of silicon-bonded hydrogen atoms in this organohydrogenpolysiloxane to the alkenyl groups in components (A) and (B); and
(D) a hydrosilylation reaction catalyst in a catalytic quantity.
(2) The solventless release coating organopolysiloxane composition according to (1), characterized in that alkenyl content of component (B) is within a range of 0.05 to 0.20 wt %.
(3) The solventless release coating organopolysiloxane composition according to (1), characterized in that component (A) is 100 weight parts of at least one organopolysiloxane fluid selected from the group consists of: linear organopolysliloxane, branched organopolysiloxane, mixture of organopolysiloxanes having different alkenyl contents of 0.10 to 3.0 wt %, and mixture of linear organopolysliloxane and branched organopolysiloxane.
(4) The solventless release coating organopolysiloxane composition according to (1), characterized in that component (A) is a mixture of (A-1) polydimethylsiloxane having alkenyl groups only in its molecular terminals and (A-2) polydimethylsiloxane having alkenyl groups in its molecular terminals and its side-chain positions.
(5) The solventless release coating organopolysiloxane composition according to (1), characterized in that component (A) comprises at least one organopolysiloxane fluid having a branched structure and a viscosity at 25° C. of 10 to 1,000 mPa s, comprising the siloxane units (i) to (iii) described below, and having a straight-chain moiety comprising a plurality of siloxane unit (ii)'s, and a branch point comprising siloxane unit (i), wherein the terminals of the straight-chain moiety are end blocked by the siloxane unit (iii):
(i) the siloxane unit represented by the general formula $SiO_{4/2}$: 1 or more
(ii) the siloxane unit represented by the general formula $R_2SiO_{2/2}$: 15 to 995
(iii) the siloxane unit represented by the general formula $R^a R_2 SiO_{1/2}$ in the formulae, $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group, and R is a group selected from the group consisting of alkyl having 1 to 8 carbon atoms, alkenyl having 2 to 8 carbon atoms, and phenyl, wherein at least 0.10 to 3.0 wt % of the $R^a$ and R in the molecule are alkenyl group having 2 to 8 carbon atoms and at least 50% of the total number of $R^a$ and R in the molecule is alkyl group having 1 to 8 carbon atoms.
(6) The solventless release coating organopolysiloxane composition according to (5), characterized in that component (A) comprises at least one organopolysiloxane fluid having a branched structure and represented by the average siloxane unit formula (2):

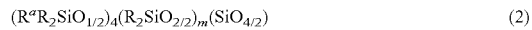

wherein $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group; R is a group selected from the group consisting of alkyl having 1 to 8 carbon atoms, alkenyl having 2 to 8 carbon atoms, and phenyl; at least 3 wt % of the $R^a$ and R in the molecule are alkenyl having 2 to 8 carbon atoms; at least 50% of the total number of $R^a$ and R in the molecule is alkyl having 1 to 8 carbon atoms; and m=15 to 995.
(7) The solventless release coating organopolysiloxane composition according to (5), characterized in that component (A) is an organopolysiloxane having a branched structure and represented by the average siloxane unit formula (3):

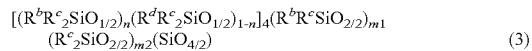

wherein $R^b$ is alkenyl group having 2 to 8 carbon atoms; $R^c$ is alkyl group having 1 to 8 carbon atoms or phenyl; $R^d$ is a group selected from the group consisting of alkyl having 1 to 8 carbon atoms, alkoxy having 1 to 8 carbon atoms, and the hydroxyl group; there are at least three $R^b$ in the molecule; at least 50% of the total number of $R^b$, $R^c$, and $R^d$ in the molecule is alkyl having 1 to 8 carbon atoms; n is 0 or 1; m1 is a number with a value of at least 1; m2 is a number with a value of at least 0; and m1+m2=15 to 995.
(8) The solventless release coating organopolysiloxane composition according to any of (1) to (7), that characteristically additionally comprises (E) a hydrosilylation reaction inhibitor at 0.001 to 5 weight parts and is non-curing at ambient temperature and cures under the application of heat.

(9) A cured release coating-bearing sheet-form substrate yielded by curing the solventless release coating organopolysiloxane composition according to any of (1) to (8) in the form of a thin film on a sheet-form substrate.

(10) The cured release coating-bearing sheet-form substrate according to (9), characterized in that the sheet-form substrate is glassine paper, clay-coated paper, polyolefin-laminated paper, thermoplastic resin film, or metal foil.

(11) A production method for a cured release coating-bearing sheet-form substrate by applying the solventless release coating organopolysiloxane composition according to any of (1) to (8) on at least one side of sheet-form substrate with multiple rolls coater.

Through the combination between (A) said reactive organopolysiloxane fluid having specific viscosity (10 to 1000 mPa·s) and alkenyl content of 0.1 to 3.0 wt % and (B) diorganopolysiloxane having a viscosity at 25° C. of 10,000 to 150,000 mPa s, 0.05 to 0.30 wt % of alkenyl groups at the pendant position of its siloxane-chain and trialkylsiloxy-terminals in hydrosilylation curing system, the obtained release coating composition keep suitable viscosity for multiple roll-coater, and perform:

i) high-speed cure with low amount of catalyst,
ii) cured layer with low migration,
iii) slippery & good smooth touch of the coating surface,
iv) good anchorage to the substrate, and
v) low release force to sticky adhesives.

This results in the application use of:
i) the noise reduction in application stage,
ii) protection of operators from friction burn during repeatedly peeling release liner, and
iii) the risk reduction of blocking problems in making in situ two side coating process.

BEST MODE FOR CARRYING OUT THE INVENTION

The solventless release coating organopolysiloxane composition having a viscosity of 50 to 3,000 mPa s of the present invention characteristically comprises (A) 100 weight parts of an organopolysiloxane fluid having a viscosity at 25° C. of 10 to 1,000 mPa s and alkenyl content of 0.10 to 3.0 wt %;

(B) 0.5 to 15 weight parts of a diorganopolysiloxane represented by the average structural formula (1), having a viscosity at 25° C. of 10,000 to 150,000 mPa s and alkenyl content of 0.05 to 0.30 wt %:

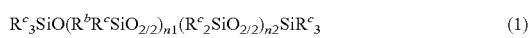

$R^c_3SiO(R^bR^cSiO_{2/2})_{n1}(R^c_2SiO_{2/2})_{n2}SiR^c_3$      (1)

wherein $R^b$ is alkenyl having 2 to 8 carbon atoms; $R^c$ is alkyl group having 1 to 8 carbon atoms or phenyl; n1 is a number that provides alkenyl content of 0.05 to 0.30 wt %; n2 is a number with a value of at least 1; and n1+n2 is a number that provides this component with a viscosity at 25° C. of 10,000 to 150,000 mPa s;

(C) an organohydrogenpolysiloxane that has a viscosity at 25° C. of 1 to 1,000 mPa s and that has at least two silicon-bonded hydrogen atoms in each molecule, wherein the silicon-bonded organic groups are alkyl group having 1 to 8 carbon atoms or phenyl group, in an amount sufficient to provide a value of 0.8:1 to 5:1 for the molar ratio of silicon-bonded hydrogen atoms in this organohydrogenpolysiloxane to the alkenyl groups in components (A) and (B); and (D) a hydrosilylation reaction catalyst in a catalytic quantity.

Component (A) is 100 weight parts of at least one organopolysiloxane fluid selected from the group consists of: linear organopolysiloxane, branched organopolysiloxane, mixture of organopolysiloxanes having different alkenyl contents of 0.10 to 3.0 wt %, and mixture of linear organopolysiloxane and branched organopolysiloxane.

Component (A) is a mixture of (A-1) polydimethylsiloxane having alkenyl groups only in its molecular terminals and (A-2) polydimethylsiloxane having alkenyl groups in its molecular terminals and its side-chain positions.

Component (A) comprises at least one organopolysiloxane fluid having a branched structure and a viscosity at 25° C. of 10 to 1,000 mPa s, comprising the siloxane units (i) to (iii) described below, and having a straight-chain moiety comprising a plurality of siloxane unit (ii)'s, and a branch point comprising siloxane unit (i), wherein the terminals of the straight-chain moiety are end blocked by the siloxane unit (iii)

(i) the siloxane unit represented by the general formula $SiO_{4/2}$: 1 or more
(ii) the siloxane unit represented by the general formula $R_2SiO_{2/2}$: 15 to 995
(iii) the siloxane unit represented by the general formula $R^aR_2SiO_{1/2}$ in the formulae, $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group, and R is a group selected from the group consisting of alkyl having 1 to 8 carbon atoms, alkenyl having 2 to 8 carbon atoms, and phenyl, wherein at least 0.10 to 3.0 wt % of the $R^a$ and R in the molecule are alkenyl group having 2 to 8 carbon atoms and at least 50% of the total number of $R^a$ and R in the molecule is alkyl group having 1 to 8 carbon atoms.

Component (A) comprises at least one organopolysiloxane fluid having a branched structure and represented by the average siloxane unit formula (2):

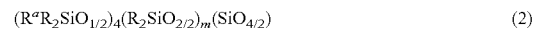

$(R^aR_2SiO_{1/2})_4(R_2SiO_{2/2})_m(SiO_{4/2})$      (2)

wherein $R^a$ is a group selected from the group consisting of alkyl having 1 to 8 carbon atoms, alkenyl having 2 to 8 carbon atoms, phenyl, alkoxy having 1 to 8 carbon atoms, and the hydroxyl group; R is a group selected from the group consisting of alkyl having 1 to 8 carbon atoms, alkenyl having 2 to 8 carbon atoms, and phenyl; at least 3 wt % of the $R^a$ and R in the molecule are alkenyl having 2 to 8 carbon atoms; at least 50% of the total number of $R^a$ and R in the molecule is alkyl having 1 to 8 carbon atoms; and m=15 to 995.

Component (A) is an organopolysiloxane having a branched structure and represented by the average siloxane unit formula (3):

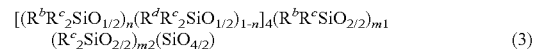

$[(R^bR^c_2SiO_{1/2})_n(R^dR^c_2SiO_{1/2})_{1-n}]_4(R^bR^cSiO_{2/2})_{m1}(R^c_2SiO_{2/2})_{m2}(SiO_{4/2})$      (3)

wherein $R^b$ is alkenyl group having 2 to 8 carbon atoms; $R^c$ is alkyl group having 1 to 8 carbon atoms or phenyl; $R^d$ is a group selected from the group consisting of alkyl having 1 to 8 carbon atoms, alkoxy having 1 to 8 carbon atoms, and the hydroxyl group; there are at least three $R^b$ in the molecule; at least 50% of the total number of $R^b$, $R^c$, and $R^d$ in the molecule is alkyl having 1 to 8 carbon atoms; n is 0 or 1; m1 is a number with a value of at least 1; m2 is a number with a value of at least 0; and m1+m2=15 to 995.

In preferable component (A), $R^b$ is vinyl or hexenyl group, m1 ranges 0 to 20 and total number of siloxane units (=m1+m2+4) ranges from 50 to 400. The preferred viscosity of component (A) ranges from 50 to 1,000 mPa s. The vinyl content is within the range of 0.10 to 3.0 wt %.

Typical examples of this alkyl having 1 to 8 carbon atoms are methyl, ethyl, propyl, and so forth, with methyl being preferable. Typical examples of the alkenyl having 2 to 8 carbon atoms are vinyl, allyl, hexenyl, and so forth, with vinyl being preferable. The alkoxy having 1 to 8 carbon atoms can be methoxy, ethoxy, and so forth.

The $R^aR_2SiO_{1/2}$ unit can be exemplified by the $Vi(Me_2)SiO_{1/2}$ unit, $He(Me)_2SiO_{1/2}$ unit, $(Me)_3SiO_{1/2}$ unit, $ViMePhSiO_{1/2}$ unit, and $(HO)(Me)_2SiO_{1/2}$ unit (wherein Vi denotes the vinyl group, He denotes the hexenyl group, Me denotes the methyl group, and Ph denotes the phenyl group; this also applies hereafter). The combination of these units (for example, $Vi(Me_2)SiO_{1/2}$ unit and $(Me)_3SiO_{1/2}$ unit) is possible in the same molecule.

The $R_2SiO_{2/2}$ unit can be exemplified by the $(Me)_2SiO_{2/2}$ unit, $ViMeSiO_{2/2}$ unit, and $MePhSiO_{2/2}$ unit. The combination of these units (for example, $(Me)_2SiO_{2/2}$ unit and $ViMeSiO_{2/2}$ unit) is possible in the same molecule.

In order to realize an excellent anchorage to the substrate, the $R^aR_2SiO_{1/2}$ unit preferably contains alkenyl having 2 to 8 carbon atoms, such as the $Vi(Me)_2SiO_{1/2}$ unit, $He(Me)_2SiO_{1/2}$ unit, and $ViMePhSiO_{1/2}$ unit.

The silicon-bonded alkenyl groups in component (A) undergo crosslinking by a hydrosilylation reaction with the silicon-bonded hydrogen atoms in component (C). At least 2 alkenyl groups must therefore be present in each molecule; at least 3 alkenyl groups must be present in each molecule in order to develop excellent adherence to the sheet-form substrate.

Component (A) is the base component of the solventless release coating organopolysiloxane composition according to the present invention. Preferably, component (A) may have a low degree of polymerization. The component (B) preferably has a straight chain structure and has a high viscosity and hence a high degree of polymerization. The component (B) possesses pendant vinyl functional group, which can form covalent bond with cured system by hydrosilylation. And the trimethylsiloxy terminal is not cured with the system, which can help lead partial of molecular chain migrate to the surface of cured release coating. This property can provide the cured release coating with a slippery touch feeling and low release force. Siloxane having a moderate viscosity (10,000 to 150,000 mPa s at 25° C.) can provide the final release coating bath with feasible viscosity for multiple rolls coater, and also can have an appropriate reactivity when vulcanization.

Due to this, the incorporation of just small amounts of component (B) can provide the cured coating with an excellent slipperiness.

In this invention, component (A) is not limited as Q-branched polymer, but includes "linear organopolysiloxane, Q-branched organopolysiloxanes, mixtures of different linear organopolysiloxanes, and mixtures of linear- and Q-branched organopolysiloxanes". Most preferred component (A) is Q-branched one and mixture thereof.

Component (B), a diorganopolysiloxane represented by the average structural formula (1), having a viscosity at 25° C. of 10,000 to 150,000 mPa s and alkenyl content of 0.05 to 0.30 wt %:

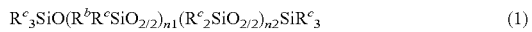
(1)

(wherein $R^b$ is alkenyl having 2 to 8 carbon atoms; $R^c$ is alkyl group having 1 to 8 carbon atoms or phenyl; each $R^b$ may be the same or different, and each $R^c$ may be the same or different in the same molecule, n1 is a number that provides alkenyl content of 0.05 to 0.30 wt %; n2 is a number with a value of at least 1; and n1+n2 is a number that provides this component with a viscosity at 25° C. of 10,000 to 150,000 mPa s), functions to improve the releasability of the cured coating with respect to tacky substances and also functions to provide the cured coating with slipperiness. Component (B) gradually ascends onto the coating formed when curing occurs through the hydrosilylation reaction between components (A) and (C) and thereby imparts an excellent slipperiness to the surface of the cured coating. The component (B) possesses pendant vinyl functional group(alkenyl group), which can form covalent bond with cured system by hydrosilylation. And the trialkylsiloxy terminal is not cured with the system, which can help lead partial of molecular chain migrate to the surface of cured release coating. This property can provide the cured release coating with a slippery touch feeling and low release force. Siloxane having a moderate viscosity (10,000 to 150,000 mPa s at 25° C.) can provide the final release coating bath with feasible viscosity for multiple rolls coater, and also can have an appropriate reactivity when vulcanization.

In addition, the concept of current invention is different from said "bleed-out" effect, because the pendant alkenyl group in the siloxane can act as "anchor" point to bond component (B) into cured system. And siloxane having a viscosity of 10,000 to 150,000 mPa s at 25° C. has entanglement effect with cured system, which would also reduce silicone migration.

Here, typical examples of the alkyl having 1 to 8 carbon atoms are methyl, ethyl, propyl, and so forth, with methyl being preferable. Typical examples of the alkenyl having 2 to 8 carbon atoms are vinyl, allyl and hexenyl with vinyl being preferable.

The $R^bR^cSiO_{2/2}$ unit can be exemplified by the $ViMeSiO_{2/2}$ unit.

The $R^c_2SiO_{2/2}$ unit can be exemplified by the $(Me)_2SiO_{2/2}$ unit and $MePhSiO_{2/2}$ unit.

The combination of these units is possible in the same molecule.

Component (B) includes a component that has silicon-bonded alkenyl groups in the molecule and thus is capable of undergoing a hydrosilylation reaction with component (C). Viewed from the perspective of the residual adhesiveness associated with the cured coating, there is a preference for component (B) having alkenyl groups in the molecule and thus being capable of undergoing a hydrosilylation reaction with component (C)

With regard to a component (B) that has silicon-bonded alkenyl groups in the molecule and thus that is capable of undergoing a hydrosilylation reaction with component (C), an excessively high alkenyl content results in impaired release properties and a reduced slipperiness for the cured coating. If component (B) has too low alkenyl content, this will cause no-bonding and more migration. The content of alkenyl in component (B) is therefore preferably of 0.05 to 0.30 wt % of the silicon-bonded organic groups in the molecule. The silicon-bonded alkenyl is present in side-chain position, not terminal.

Component (B) has a viscosity at 25° C. of 10,000 to 150,000 mPa s, while viewed from the standpoint of the residual adhesiveness its viscosity is preferably 20,000 to 130,000 mPa s.

In some embodiments, component (B) has a viscosity lower than 100,000 mPa s, preferably lower than 99,000 mPa s. In other embodiments, component (B) has a viscosity comprised between 100,000 and 150,000 mPa s, more preferably between 100,000 and 130,000 mPa s.

Component (B) is incorporated at 0.5 to 15 weight parts, in each case per 100 weight parts of the aforementioned component (A). The surface of the cured coating has an inadequate slipperiness when component (B) is incorporated at less than the aforementioned lower limit. When the aforementioned upper limit is exceeded, the organopolysiloxane composition assumes an excessively high viscosity, causing disturbances in the coating of a thin film on the sheet-form substrate.

Preferably component (B) has 0.011 to 03% of alkenyl related to the total weight of component B, more preferably from 0.06 to 0.19% of alkenyl (vinyl and/or hexenyl groups). Preferably component (B) has a viscosity of 20,000 to 130,000 mPa s. Alkenyl weight percent as herein defined are calculated for vinyl groups weight.

Component (C), an organohydrogenpolysiloxane that has a viscosity at 25° C. of 1 to 1,000 mPa·s and that has at least 2 silicon-bonded hydrogen atoms in each molecule and that has alkyl having 1 to 8 carbon atoms or phenyl for its silicon-bonded organic groups, functions as a crosslinking agent for component (A). Crosslinking occurs through a hydrosilylation reaction between the silicon-bonded hydrogen atoms in this component and the silicon-bonded alkenyl groups in component (A). As for component (B) which contains silicon-bonded alkenyl, the silicon-bonded alkenyl groups in component (B) also participate in the hydrosilylation reaction. As a consequence, at least 2 silicon-bonded hydrogen atoms must be present in each molecule and preferably at least 3 silicon-bonded hydrogen atoms are present in each molecule.

The bonding position of the silicon-bonded hydrogen atoms is not particularly limited, and, for example, they may be bonded in molecular chain terminal position, side-chain position, or at both positions.

The silicon-bonded hydrogen atom content is preferably 0.1 to 20 weight % and more preferably is 0.5 to 18 weight %.

The silicon-bonded organic groups encompass phenyl and alkyl having 1 to 8 carbon atoms, such as methyl, ethyl, propyl, butyl, octyl, and so forth, and preferably at least 50% of the total number of these organic groups is alkyl having 1 to 8 carbon atoms. The methyl group is preferred among these alkyl groups from the standpoint of the properties of the cured coating and the ease of production. The molecular structure of component (C) is exemplified by straight chain, branched chain, branched, and cyclic.

Component (C) has a viscosity at 25° C. of 1 to 1,000 mPa s and preferably 5 to 500 mPa s. The basis for this is as follows: when the viscosity at 25° C. is less than 1 mPa s, component (C) readily volatilizes out of the organopolysiloxane composition; the organopolysiloxane composition takes on long cure times at above 1,000 mPa s.

This component (C) can be exemplified by trimethylsiloxy-endblocked methylhydrogenpolysiloxanes, trimethylsiloxy-endblocked dimethylsiloxane methylhydrogensiloxane copolymers, dimethylhydrogensiloxy-endblocked dimethylsiloxane methylhydrogensiloxane copolymers, cyclic methylhydrogenpolysiloxanes, cyclic methylhydrogensiloxane dimethylsiloxane copolymers, tris(dimethylhydrogensiloxy)methylsilane, and tetra(dimethylhydrogensiloxy)silane.

Plural components (C) which are different each other may also be used together for preparing the same composition.

Component (C) is incorporated in an amount sufficient to provide a value of 0.8:1 to 5:1 for the molar ratio of silicon-bonded hydrogen atoms in component (C) to alkenyl groups in components (A) and (B) (ratio SiH/vi) and preferably in an amount sufficient to provide a value of 0.9:1 to 3:1 for this molar ratio. Preferably, the molar ratio SiH/vi is > or equal to 0.8. Preferably the ratio SiH/vi is > or equal to 1.2. More preferably the ratio SiH/vi is > or equal to 1.5. Preferably the molar ratio SiH/vi is < or equal to 5, preferably < or equal to 3. Such rations are favourable to reduce migration. The curability is reduced when this molar ratio is less than the lower limited cited above, while a large peel resistance value occurs when the cited upper limit is exceeded and practical releasability is not obtained.

Component (D) is a catalyst that promotes the hydrosilylation reaction between the silicon-bonded hydrogen atoms in component (C) and the silicon-bonded alkenyl groups in component (A) and functions to bring about crosslinking by an addition reaction between components (A) and (C). When component (B) contains one or more silicon-bonded alkenyl groups in each molecule, this catalyst also promotes the hydrosilylation reaction with the silicon-bonded alkenyl groups in component (B).

There are no particular limitations on this component (D) other than that it is a catalyst used for the hydrosilylation reaction, and component (D) can be specifically exemplified by platinum-type catalysts such as chloroplatinic acid, alcohol-modified chloroplatinic acid, chloroplatinic acid/olefin complexes, chloroplatinic acid/ketone complexes, platinum/alkenylsiloxane complexes, platinum tetrachloride, platinum micropowder, solid platinum supported on a support such as alumina powder or silica powder, platinum black, olefin complexes of platinum, carbonyl complexes of platinum, and the powdery thermoplastic resin (e.g., methyl methacrylate resin, polycarbonate resin, polystyrene resin, silicone resin, and so forth) that incorporates a platinum-type catalyst as previously listed.

Other examples are rhodium catalysts such as [Rh($O_2CCH_3$)$_2$]$_2$, Rh($O_2CCH_3$)$_3$, Rh$_2$($C_8H_{15}O_2$)$_4$, Rh($C_5H_7O_2$)$_3$, Rh($C_5H_7O_2$)(CO)$_2$, Rh(CO)[Ph$_3$P]($C_5H_7O_2$), RhX$_3$[(R$_6$)$_2$S]$_3$, (R$_{73}$P)$_2$Rh(CO)$_x$, (R$_{73}$P)$_2$Rh(CO)H, Rh$_2$X$_2$Y$_4$, H$_a$Rh$_b$(E)$_c$Cl$_d$, and Rh[O(CO)R$_3$]$_{3-n}$(OH)$_n$ (in the formulas, X is the hydrogen atom, chlorine atom, bromine atom, or iodine atom; Y is alkyl, CO, or $C_8H_{14}$; R$_6$ is alkyl, cycloalkyl, or aryl; R$_7$ is alkyl, aryl, alkyloxy, or aryloxy; E is an olefin; a is 0 or 1; b is 1 or 2; c is an integer from 1 to 4; d is 2, 3, or 4; and n is 0 or 1) and iridium catalysts such as Ir(OOCCH$_3$)$_3$, Ir($C_5H_7O_2$)$_3$, [Ir(Z)(E)$_2$]$_2$, and [Ir(Z)(Diene)]$_2$ (in the formulas, Z is the chlorine atom, bromine atom, iodine atom, or an alkoxy group; E is an olefin; and Diene is cyclooctadiene).

Viewed from the perspective of the ability to accelerate the reaction, chloroplatinic acid, platinum/vinylsiloxane complexes, and olefin complexes of platinum are preferred, and the chloroplatinic acid/divinyltetramethyldisiloxane complex, chloroplatinic acid/tetramethyltetravinylcyclotetrasiloxane complex, and platinum/alkenylsiloxane complexes, e.g., the platinum divinyltetramethyldisiloxane complex, platinum/tetramethyltetravinylcyclotetrasiloxane complex, and so forth, are particularly preferred.

Component (D) is incorporated in a catalytic amount, and in general is incorporated at 1 to 1,000 ppm and preferably is incorporated at 5 to 500 ppm, in each case as the amount of metal in component (D) with reference to the total weight of the solventless release coating organopolysiloxane composition of the present invention.

In addition to the components described in the preceding, the solventless release coating organopolysiloxane composition of the present invention preferably also contains a hydrosilylation reaction inhibitor (E) in order to render it thermosetting while improving the storage stability by inhibiting gelation and curing at ambient temperature. This hydrosilylation reaction inhibitor can be exemplified by acetylenic compounds, ene-yne compounds, organonitrogen compounds, organophosphorus compounds, and oxime compounds and can be specifically exemplified by alkynyl alcohols such as 3-methyl-1-butyn-3-ol, 3,5-dimethyl-1-hexyn-3-ol, 3-methyl-1-pentyn-3-ol, phenylbutynol, and so forth; and by 3-methyl-3-penten-1-yne, 3,5-dimethyl-1-hexyn-3-ene, benzotriazole, 1-ethynyl-1-cyclohexanol, and methylvinylcyclosiloxanes. The amount of incorporation of this hydrosilylation reaction inhibitor is generally in the range of 0.001 to 5 weight parts and preferably in the range of 0.01 to 2 weight parts, in each case per 100 weight parts of component (A), and may be selected as appropriate in view of the type of hydrosilylation reaction inhibitor, the properties and amount of incorporation of the hydrosilylation reaction catalyst, the amount of alkenyl groups in component (A), and the amount of silicon-bonded hydrogen atoms in component (C).

The composition of the present invention can be prepared by mixing the aforementioned components (A) to (D), or the aforementioned components (A) to (E), or these components and any other optional components, to homogeneity. The order of incorporation of the individual components is not particularly limited; however, when the composition will not be used immediately after mixing, a mixture of components (A), (B), and (C) is preferably stored separately from component (D) and the two are preferably mixed just before use. In the case of a composition comprising components (A) to (E), a composition is also preferred that, through the selection of the type of component (E) and the adjustment of the quantity of component (E) incorporation, does not undergo crosslinking at ambient temperature while undergoing crosslinking and curing upon the application of heat.

A cured release coating that exhibits an excellent slipperiness and a suitable peel resistance value with respect to tacky substances can be formed on the surface of a sheet-form substrate, by uniformly coating the solventless release coating organopolysiloxane composition of the present invention as described above on the surface of any of various sheet-form substrates, e.g., glassine paper, cardboard, clay-coated paper, polyolefin-laminated paper and particularly polyethylene-laminated paper, thermoplastic resin film (e.g., polyester film, polyethylene film, polypropylene film, polyamide film), natural fibre fabrics, synthetic fibre fabrics, metal foils (e.g., aluminum foil), and so forth, and heating under conditions suitable for causing components (A) and (C), or components (A), (B) and (C) to undergo crosslinking through the hydrosilylation reaction.

Generally 50 to 200° C. is appropriate for the curing temperature of the solventless release coating organopolysiloxane composition of the present invention on the sheet-form substrate, but curing temperatures above 200° C. can be used when the substrate possesses a good heat resistance. The method of heating is not particularly limited and can be exemplified by heating in a hot air circulation oven, passage through a long oven, or radiant heating using an infrared lamp or a halogen lamp. Curing can also be effected by using heating in combination with exposure to ultraviolet radiation. When component (D) is a platinum/alkenylsiloxane complex catalyst, even when this catalyst is incorporated at 50 to 200 ppm as the amount of platinum metal with reference to the total quantity of the composition, a cured coating that exhibits an excellent adherence to sheet-form substrates and excellent release properties with respect to tacky substances can be readily obtained in a brief period of time, i.e., 40 to 1 second, at 100 to 150° C.

The solventless release coating organopolysiloxane composition of the present invention is especially preferably applied on at least one side of sheet-form substrate with multiple rolls coater. With regard to the tacky substance that can be applied to the release sheet or film yielded by the application and curing of the solventless release coating organopolysiloxane composition of the present invention onto the surface of a sheet-form substrate, this tacky substance can be, for example, any of various pressure-sensitive adhesives and various adhesives, and examples thereof are acrylic resin-type pressure-sensitive adhesives, rubber-type pressure-sensitive adhesives, and silicone-type pressure-sensitive adhesives, as well as acrylic resin-type adhesives, synthetic rubber-type adhesives, silicone-type adhesives, epoxy resin-type adhesives, and polyurethane-type adhesives. Other examples are asphalt, sticky foods such as mochi (i.e. rice cake), glues and pastes, and bird lime. Preferred Application of present invention is multiple rolls coater with in situ two side coating process.

The composition of the present invention is useful for the formation of cured coatings that exhibit an excellent surface slipperiness and an excellent low release performance versus tacky substances, and in particular is well suited as a cured release coating-forming agent for process paper, asphalt packaging paper, and various plastic films. In addition, sheet-form substrates bearing a release coating formed by the cure of the composition of the present invention are well-suited for use in particular for process paper, wrapping or packaging paper for tacky substances and sticky substances, pressure-sensitive adhesive tape, pressure-sensitive labels, and so forth.

EXAMPLES

Examples and comparative examples are given below in order to specifically describe the present invention; however, the present invention is not limited to the examples that follow. In the examples and comparative examples that follow, parts are weight parts in all instances and ppm denotes weight-ppm in all instances. Here, PDMS means polydimethylsiloxane. Silicones 1 to 5, 9 shown in below Table 1. are available in market from Dow Corning Corporation.

TABLE 1

Raw material selection for base polymer, shown in the following table:

| Nomenclature | Chemical description |
|---|---|
| Siloxane 1 (Dow-Corning) | Siloxane composed of Q, D, $M^{vi}$ unit, viscosity is about 370 mPa s, vi % = 0.65% |
| Siloxane 2 (Dow-Corning) | $M^{vi}$ terminated PDMS, about 240 mPa s, vi % = 0.63%. |
| Siloxane 3 (Dow-Corning) | PDMS with vinyl at pendant and terminal position, 350 mPa s, vi % = 1.11%. |
| Siloxane 4 (Dow-Corning) | PDMS, 29,000 mPa s. Trimethylsiloxy capped. |
| Siloxane 5 (Dow-Corning) | PDMS with vinyl at pendant position, 36000 mPa s, vi % = 0.12%. Trimethylsiloxy capped. |
| Siloxane 6 (lab made) | PDMS with vinyl at pendant position, 14,500 mPa s, vi % = 0.15%. Trimethylsiloxy capped. |
| Siloxane 7 (lab made) | PDMS with vinyl at pendant position, 111,000 mPa s, vi % = 0.085%. Trimethylsiloxy capped. |

TABLE 1-continued

Raw material selection for base polymer, shown in the following table:

| Nomenclature | Chemical description |
|---|---|
| Siloxane 8 (lab made) | PDMS with vinyl at pendant position, 51,000 mPa s, vi % = 0.34%. Trimethylsiloxy capped. |
| Siloxane 9 (Dow-Corning) | Mixture of methylhydrogen siloxane and dimethyl, methylhydrogen siloxane |

Note:
Q: $SiO_{4/2}$,
D: $Me_2SiO_{2/2}$,
M: $Me_3SiO_{1/2}$,
vi: vinyl,
$M^{vi}$: $ViMe_2SiO_{1/2}$.

Preparation of Siloxane 6-8:

Vinyl polymer synthesis process (Siloxane 6-8), including the following steps, according to the following formulation shown in Table 2:

(1) Equipment setup and nitrogen purge system for 20 min. Then slow down the nitrogen flow (1 bubble/2 sec) to inert system.
(2) Load octamethylcyclotetrasiloxane, tetramethyltetravinylcyclotetrasiloxane and PDMS 10 mPa s via funnel.
(3) Heat to 100° C. and then load dimethyl siloxane di-potassium salt, then heat to 165° C. and hold for 3 h.
(4) After viscosity stable, add neutralizer at 165° C. and hold at 165° C. for 30 min.
(5) Use rotary evaporator to strip the unreacted volatile.

TABLE 2

Synthesis Formulation of Siloxanes 6 to 8

|  | Siloxane 6 | Siloxane 7 | Siloxane 8 |
|---|---|---|---|
| Octamethylcyclotetrasiloxane | 243.4 g | 246.3 g | 243.7 g |
| Tetramethyltetravinylcyclotetrasiloxane | 1.112 g | 0.61 g | 2.52 g |
| PDMS 10 mPa s | 5.38 g | 2.96 g | 3.67 g |
| dimethyl siloxane di-potassium salt | 0.091 g | 0.091 g | 0.091 g |
| neutralizer (mixture of hexamethyldisiloxane, vinylphosphonic acid, trimethylsilyl vinylphosphonic acid, diphosphonic acid, bis(trimethylsilyl) vinylphosphonate, etc) | 0.011 g | 0.011 g | 0.011 g |

Evaluation processes:

(1) Coating Cure NNN*: coat the bath on PEK (polyethylene coated kraft) substrate and then cured at 110° C. Record the least cure time by second that required forming a non-smear, non-rub off, and non-migration coating.
  * Abbreviation for Non-smear, Non-rub off, and Non-migration coating (NNN)
(2) Coat weight (CW): use X-Ray to detect the coat weight of silicone by Oxford lab-x 3500 instrument. Use uncoated PEK as blank and a calibration from known PDMS coated PEK liner. Refer to FINAT Test Method No. 7 (FINAT Technical Handbook 7th edition, 2005).
(3) Slippery: Use 2 to 3 volunteers to test the smoothness by finger slip and rank the samples in order of smoothness.
(4) Coefficient of kinetic friction (COF): COF is tested on Texture Analyzer TA-XT2. Use a pulley to convert the moving direction of probe to horizontal. The bottom side of load cell is covered by printer paper. Fix cured release coating and let release coated surface in contact with bottom of load cell. This was followed by pulling with conditions of load=156.09 g and pulling speed=2.50 mm/s and the force (g) required for pulling was measured. The force (g) required for pulling/156.09 g was designated as the COF of the cured coating.
(5) Anchorage: use X-Ray to detect the coat weight of silicone by Oxford lab-x 3500 instrument. Then use Abrasion Tester (Elcometer 1720) to rub the sample 30 cycles at a speed of 30 cycles/min. Finally, measure the coat weight again. The relative anchorage rate is recorded as CW-after/CW-before×100%.
(6) Release force (RF): the 180 degree peeling test is used to measure release force from liner with Tesa 7475 standard tape laminated on coated release coating, load weight of 20 g/cm² on laminated sample and left under room temperature or 70° C. for 20 h. After 20 hours aging, move the sample to room temperature, remove the load and wait for 30 min. Then test the release force by ChemInstruments AR-1500. Refer to FINAT Test Method No. 10 (FINAT Technical Handbook 7th edition, 2005).
(7) SAS (Subsequent Adhesive Strength, indicator of migration): test sample is laminated by Nitto Denko 31B tape on coated release coating, load weight of 20 g/cm2 and left under 70° C. for 20 h. After 20 h, remove the load and wait for 30 min at room temperature. Then transfer the 31B tape on PET substrate and wait for another 1 h. Test the release force by ChemInstruments AR-1500. In SAS test, laminate 31B tape on PTFE substrate and treat the PTFE sample the same way as release coating sample. The SAS value is recorded as RF release/RFPTFE×100%. Refer to FINAT Test Method No. 11 (FINAT Technical Handbook 7th edition, 2005).

Composition formulation of Examples:

The performance behaviour of release composition of branched siloxane 1 mixed with high MW siloxane 4 to siloxane 8 was systematically compared in the current invention. Siloxane 9 is used as crosslinker in each formulation shown in the following table 3:

TABLE 3

| Ex. | Siloxane 1 | Siloxane 4 | Siloxane 5 | Siloxane 6 | Siloxane 7 | Siloxane 8 | Siloxane 9*1 | ETCH *2 | Pt catalyst |
|---|---|---|---|---|---|---|---|---|---|
| 1 | 96 | 4 |   |   |   |   | 2.84 | 0.24 | 60 ppm |
| 2 | 96 |   | 4 |   |   |   | 2.89 | 0.24 | 60 ppm |
| 3 | 96 |   |   | 4 |   |   | 2.89 | 0.24 | 60 ppm |
| 4 | 96 |   |   |   | 4 |   | 2.89 | 0.24 | 60 ppm |
| 5 | 96 |   |   |   |   | 4 | 2.93 | 0.24 | 60 ppm |
| 6 | 100 |   |   |   |   |   | 2.98 | 0.25 | 60 ppm |

*1 Cross-linker: SiH/Vi ratio is 1.4 (in common).
*2 Inhibitor: 1-ethynyl-1-cyclohexanol (ETCH)

The performance behaviour of release composition of linear polyorganosiloxane siloxane 2 and siloxane 3 were used as base polymer, then mixed with high MW siloxane 5 was compared in current invention, shown in the following table 4:

TABLE 4

| Ex. | Siloxane 2 | Siloxane 3 | Siloxane 5 | Siloxane 9*[1] | ETCH*[2] | Pt catalyst |
|---|---|---|---|---|---|---|
| 7 | 48 | 48 | 4 | 3.81 | 0.22 | 60 ppm |
| 8 | 50 | 50 |   | 3.94 | 0.23 | 60 ppm |

*[1]Cross-linker: SiH/Vi ratio is 1.4 (in common).
*[2]Inhibitor: 1-ethynyl-1-cyclohexanol (ETCH)

Example 1 (Comparative)

Procedure:

96 parts of siloxane 1, 0.24 parts of 1-ethynyl-1-cyclohexanol (ETCH) and 4 parts of siloxane 4 were mixed together to homogeneity. Then load 2.84 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. When the siloxane 4 without vinyl group at pendant position was used, the cured coating performance was poor especially in its SAS evaluation.

Example 2 (Practical)

Procedure:

96 parts of siloxane 1, 0.24 parts of 1-ethynyl-1-cyclohexanol (ETCH) and 4 parts of siloxane 5 were mixed together to homogeneity. Then load 2.89 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. As shown in the table, the cured coating performance was sufficient in its all evaluations.

Example 3 (Practical)

Procedure:

96 parts of siloxane 1, 0.24 parts of 1-ethynyl-1-cyclohexanol (ETCH) and 4 parts of siloxane 6 were mixed together to homogeneity. Then load 2.89 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. As shown in the table, the cured coating performance was sufficient in its all evaluations.

Example 4 (Practical)

Procedure:

96 parts of siloxane 1, 0.24 parts of 1-ethynyl-1-cyclohexanol (ETCH) and 4 parts of siloxane 7 were mixed together to homogeneity. Then load 2.89 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. As shown in the table, the cured coating performance was sufficient in its all evaluations.

Example 5 (Comparative)

Procedure:

96 parts of siloxane 1, 0.24 parts of 1-ethynyl-1-cyclohexanol (ETCH) and 4 parts of siloxane 8 were mixed together to homogeneity. Then load 2.93 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. When siloxane 8 with excessive amount of vinyl group at its pendant position was used, the cured coating performance was worse especially in its slippery touch evaluation compared with other practical examples.

Example 6 (Comparative)

Procedure:

100 parts of siloxane 1, and 0.25 parts of 1-ethynyl-1-cyclohexanol (ETCH) were mixed together to homogeneity. Then load 2.98 parts of siloxane 9 and mix to homogeneity. At last, load chloroplatinic acid 1,3-divinyl-1,1,3,3-tetramethyldisiloxane complex to provide 60 ppm platinum metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven After curing the release coating on PEK substrate for 22 seconds, a well-cured release coating is obtained, and then the CW, slippery, COF, anchorage, release force and SAS performance were evaluated. The result was shown in Table 5. For lack of said component (B), the cured coating performance was worse especially in its slippery touch evaluation and a higher COF compared with other practical examples.

Example 7 (Practical)

Procedure:

48 parts of siloxane 2, 48 parts of siloxane 3, 0.22 parts of 1-ethynyl-1-cyclohexanol (ETCH) and 4 parts of siloxane 5 were mixed together to homogeneity. Then load 3.81 parts of siloxane 9 and mix to homogeneity. At last, load chloroplatinic acid 1,3-divinyl-1,1,3,3-tetramethyldisiloxane complex to provide 60 ppm platinium metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. As shown in the table, the cured coating performance was sufficient in its all evaluations.

Example 8 (Comparative)

Procedure:

50 parts of siloxane 2, 50 parts of siloxane 3, and 0.23 parts of 1-ethynyl-1-cyclohexanol (ETCH) were mixed together to homogeneity. Then load 3.94 parts of siloxane 9 and mix to homogeneity. At last, load chloroplatinic acid 1,3-divinyl-1,1,3,3-tetramethyldisiloxane complex to provide 60 ppm platinium metal in the final composition and then mix to homogeneity to form a solventless silicone release coating bath. Coat the bath on PEK substrate by a blade coater (Euclid Tool & Machine Company 900-M-1N101) and then place coated liner for thermal addition cured in 110° C. oven. After curing the release coating on PEK substrate for 22 seconds, a well-cured release coating is obtained, and then the CW, slippery, COF, anchorage, release force and SAS performance were evaluated. The result was shown in Table 5. For lack of said component (B), the cured coating performance was bad in its slippery touch evaluation, higher in its release force and poor in SAS evaluation, compared with other practical examples.

TABLE 5

Performance of Examples 1 to 8(P: practical examples, C: Comparative examples)

|  | NNN, sec | CW[a] g/m² | Slippery[b] | COF | Anchorage | RF, g/in | 70° C. RF, g/in | SAS |
|---|---|---|---|---|---|---|---|---|
| 1 C | 8 | 0.85 | 1 | 0.136 | 92% | 8.6 | 10.6 | 89% |
| 2P | 8 | 0.85 | 2 | 0.141 | 96% | 8.4 | 9.9 | 100% |
| 3P | 8 | 0.85 | 2 | 0.141 | 98% | 9.3 | 11.4 | 101% |
| 4P | 8 | 0.84 | 1 | 0.086 | 98% | 9.7 | 11.3 | 98% |
| 5 C | 8 | 0.79 | 3 | 0.147 | 94% | 9.3 | 11.3 | 101% |
| 6 C | 8 | 0.86 | 3 | 0.157 | 83% | 9.4 | 11.5 | 101% |
| 7P | 10 | 0.76 | 1 | 0.075 | 99% | 11.3 | 14.6 | 100% |
| 8 C | 10 | 0.78 | 3 | 0.138 | 97% | 10.5 | 14.9 | 93% |

[a]Coat weight
[b]Blind test by volunteers using finger 1# best, #2 good, 3# worst

INDUSTRIAL APPLICABILITY

The solventless release coating organopolysiloxane composition according to the present invention is useful for the formation, on the surface of sheet-form substrates, of a cured coating that exhibits an excellent slipperiness and an excellent releasability versus tacky substances. Sheet-form substrates bearing a cured coating from the aforesaid composition according to the present invention are useful for process paper, paper for wrapping or packaging tacky substances, pressure-sensitive tape, pressure-sensitive labels, and so forth.

The invention claimed is:

1. A solventless release coating organopolysiloxane composition having a viscosity of 50 to 3,000 mPa·s, the composition comprising:
   (A) 100 parts by weight of an organopolysiloxane fluid having a viscosity at 25° C. of 10 to 1,000 mPa·s and an alkenyl content of 0.10 to 3.0 wt %;
   (B) 0.5 to 15 parts by weight of a diorganopolysiloxane represented by the average structural formula (1):

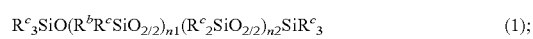
   $$R^c{}_3SiO(R^bR^cSiO_{2/2})_{n1}(R^c{}_2SiO_{2/2})_{n2}SiR^c{}_3 \qquad (1);$$

wherein $R^b$ is an alkenyl group having 2 to 8 carbon atoms; $R^c$ is an alkyl group having 1 to 8 carbon atoms or a phenyl group; n1 is a number that provides an alkenyl group content of 0.05 to 0.30 wt %; n2 is a number with a value of at least 1; and n1+n2 is a number that provides a viscosity at 25° C. of 10,000 to 150,000 mPa·s;
   (C) an organohydrogenpolysiloxane having a viscosity at 25° C. of 1 to 1,000 mPa·s and at least two silicon-bonded hydrogen atoms in each molecule, wherein each silicon-bonded organic group is an alkyl group having 1 to 8 carbon atoms or a phenyl group, and wherein component (C) is present in an amount sufficient to provide a value of 0.8:1 to 5:1 for the molar ratio of the silicon-bonded hydrogen atoms in component (C) to the alkenyl groups in components (A) and (B); and
   (D) a hydrosilylation reaction catalyst in a catalytic quantity;
   wherein component (A) comprises a mixture of:
   (A-1) a polydimethylsiloxane having alkenyl groups only in its molecular terminals; and
   (A-2) a polydimethylsiloxane having alkenyl groups in its molecular terminals and its side-chain positions.

2. The solventless release coating organopolysiloxane composition according to claim 1, wherein the alkenyl group content of component (B) is 0.05 to 0.20 wt %.

3. The solventless release coating organopolysiloxane composition according to claim 1, wherein component (A) comprises an organopolysiloxane fluid selected from the group consisting of: a linear organopolysiloxane, a branched organopolysiloxane, a mixture of organopolysiloxanes having different alkenyl group contents of 0.10 to 3.0 wt %, and a mixture of a linear organopolysiloxane and a branched organopolysiloxane.

4. The solventless release coating organopolysiloxane composition according to claim 1, wherein component (A) comprises at least one organopolysiloxane fluid having a branched structure and comprising the siloxane units (i) to (iii) described below, and having a straight-chain moiety comprising a plurality of siloxane unit (ii), and having a branch point comprising siloxane unit (i), wherein the terminals of the straight-chain moiety are end blocked by the siloxane unit (iii);

(i) the siloxane unit represented by the general formula $SiO_{4/2}$: 1 or more
(ii) the siloxane unit represented by the general formula $R_2SiO_{2/2}$: 15 to 995
(iii) the siloxane unit represented by the general formula $R^aR_2SiO_{1/2}$ in the formulae, $R^a$ is selected from the group consisting of an alkyl group having 1 to 8 carbon atoms, an alkenyl group having 2 to 8 carbon atoms, a phenyl group, an alkoxy group having 1 to 8 carbon atoms, and a hydroxyl group, and R is selected from the group consisting of an alkyl group having 1 to 8 carbon atoms, an alkenyl group having 2 to 8 carbon atoms, and a phenyl group, wherein at least 0.10 to 3.0 wt % of the $R^a$ and R in the molecule are alkenyl groups having 2 to 8 carbon atoms and at least 50% of the total number of $R^a$ and R in the molecule is alkyl groups having 1 to 8 carbon atoms.

5. The solventless release coating organopolysiloxane composition according to claim 4, wherein component (A) comprises an organopolysiloxane fluid represented by the average siloxane unit formula (2):

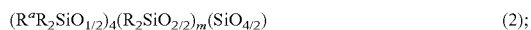

$$(R^aR_2SiO_{1/2})_4(R_2SiO_{2/2})_m(SiO_{4/2}) \quad (2);$$

wherein
R$^a$ is selected from the group consisting of an alkyl group having 1 to 8 carbon atoms, an alkenyl group having 2 to 8 carbon atoms, a phenyl group, an alkoxy group having 1 to 8 carbon atoms, and a hydroxyl group;
R is selected from the group consisting of an alkyl group having 1 to 8 carbon atoms, an alkenyl group having 2 to 8 carbon atoms, and a phenyl group;
at least 3 wt % of the $R^a$ and R in the molecule are alkenyl groups having 2 to 8 carbon atoms;
at least 50% of the total number of $R^a$ and R in the molecule is an alkyl group having 1 to 8 carbon atoms; and
m=15 to 995.

6. The solventless release coating organopolysiloxane composition according to claim 4, wherein component (A) comprises an organopolysiloxane fluid represented by the average siloxane unit formula (3):

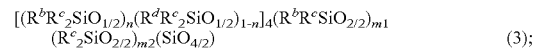

$$[(R^bR^c{}_2SiO_{1/2})_n(R^dR^c{}_2SiO_{1/2})_{1-n}]_4(R^bR^cSiO_{2/2})_{m1}(R^c{}_2SiO_{2/2})_{m2}(SiO_{4/2}) \quad (3);$$

wherein
$R^b$ is an alkenyl group having 2 to 8 carbon atoms;
$R^c$ is an alkyl group having 1 to 8 carbon atoms or a phenyl group;
$R^d$ is selected from the group consisting of an alkyl group having 1 to 8 carbon atoms, an alkoxy group having 1 to 8 carbon atoms, and a hydroxyl group;
there are at least three $R^b$ in the molecule;
at least 50% of the total number of $R^b$, $R^c$, and $R^d$ in the molecule is an alkyl group having 1 to 8 carbon atoms;
n is 0 or 1; m1 is a number with a value of at least 1; m2 is a number with a value of at least 0; and m1+m2=15 to 995.

7. The solventless release coating organopolysiloxane composition according to claim 1, further comprising:
(E) 0.001 to 5 parts by weight of a hydrosilylation reaction inhibitor that is non-curing at ambient temperature and cures under the application of heat.

8. A cured release coating-bearing sheet-form substrate yielded by curing the solventless release coating organopolysiloxane composition according to claim 1 in the form of a thin film on a sheet-form substrate.

9. The cured release coating-bearing sheet-form substrate according to claim 8, wherein the sheet-form substrate is glassine paper, clay-coated paper, polyolefin-laminated paper, thermoplastic resin film, or metal foil.

10. A production method for a cured release coating-bearing sheet-form substrate, the method comprising:
applying a solventless release coating organopolysiloxane composition on at least one side of a sheet-form substrate with a multiple rolls coater;
wherein the solventless release coating organopolysiloxane composition is according to claim 1.

11. The production method for a cured release coating-bearing sheet-form substrate according to claim 10, wherein the sheet-form substrate is glassine paper, clay-coated paper, polyolefin-laminated paper, thermoplastic resin film, or metal foil.

* * * * *